(12) United States Patent
Chang et al.

(10) Patent No.: US 10,460,628 B2
(45) Date of Patent: Oct. 29, 2019

(54) TILE MAP SERVICE DEVICE AND METHOD

(71) Applicant: Electronics and Telecommunications Research Institute, Daejeon (KR)

(72) Inventors: Yoon Seop Chang, Daejeon (KR); In Sung Jang, Sejong-si (KR); Jae Min Seol, Daejeon (KR); In Hak Joo, Daejeon (KR); Won Geun Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 94 days.

(21) Appl. No.: 15/604,042

(22) Filed: May 24, 2017

(65) Prior Publication Data
US 2017/0345342 A1    Nov. 30, 2017

(30) Foreign Application Priority Data

May 25, 2016  (KR) .......................... 10-2016-0063843

(51) Int. Cl.
| | |
|---|---|
| *G09B 29/00* | (2006.01) |
| *G06F 16/958* | (2019.01) |
| *G06T 11/60* | (2006.01) |
| *G06T 19/00* | (2011.01) |

(52) U.S. Cl.
CPC ......... *G09B 29/007* (2013.01); *G06F 16/986* (2019.01); *G06T 11/60* (2013.01); *G06T 19/006* (2013.01); *G06T 2200/16* (2013.01); *G06T 2210/32* (2013.01)

(58) Field of Classification Search
None
See application file for complete search history.

(56) References Cited

U.S. PATENT DOCUMENTS

| | | | | |
|---|---|---|---|---|
| 7,212,217 | B1* | 5/2007 | Feather ................ | G06T 17/005 345/419 |
| 2006/0200383 | A1* | 9/2006 | Arutunian ............. | G06Q 30/02 705/14.56 |
| 2009/0027418 | A1* | 1/2009 | Maru ................ | G06F 17/30241 345/629 |
| 2010/0054527 | A1* | 3/2010 | Kirmse ............ | G06F 17/30241 382/100 |
| 2010/0321399 | A1* | 12/2010 | Ellren .............. | G06F 17/30241 345/587 |

(Continued)

FOREIGN PATENT DOCUMENTS

| | | |
|---|---|---|
| KR | 1020120092346 A | 8/2012 |
| KR | 1020150097973 A | 8/2015 |

*Primary Examiner* — Jason A Pringle-Parker
(74) *Attorney, Agent, or Firm* — William Park & Associates Ltd.

(57) ABSTRACT

A tile map service (TMS) device and method are provided. The TMS device includes a storage configured to store map layers that have different map types, map data of an image tile form having a level of detail (LOD) structure of each of the map layers, and a tile map in which image tile maps of a plurality of map layers are merged; a communicator configured to receive map request information including two or more map types, an LOD level, and arbitrary map coordinates from a client; and a provider configured to provide a tile map corresponding to the map request information to the client.

8 Claims, 8 Drawing Sheets

(56) References Cited

U.S. PATENT DOCUMENTS

2012/0134599 A1    5/2012  Lee
2012/0141026 A1    6/2012  Yoon et al.
2012/0303265 A1*  11/2012  Su ..................... G01C 21/3697
                                                          701/419

* cited by examiner

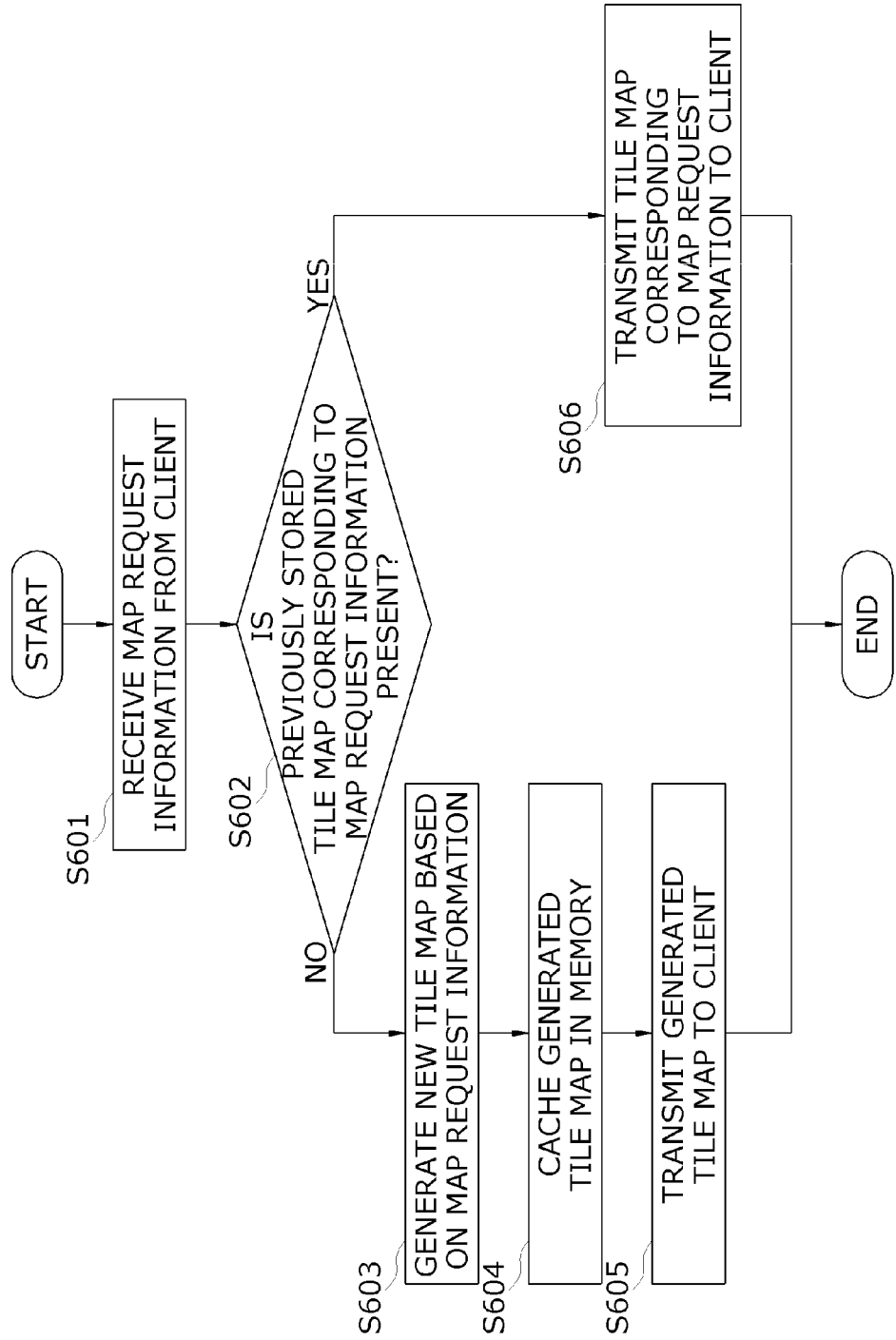

TILE MAP SERVICE DEVICE AND METHOD

CROSS-REFERENCE TO RELATED APPLICATION

This application claims priority to and the benefit of Korean Patent Application No. 10-2016-0063843, filed on May 25, 2016, the disclosure of which is incorporated herein by reference in its entirety.

BACKGROUND

1. Field of the Invention

The present invention relates to a map provision service, and more particularly, to a device for providing a tile map service (TMS) and a method of providing a TMS.

2. Discussion of Related Art

A web-based map service method has been developed in a variety of forms. A method of reconstructing map data having a vector form in a client (a user terminal) by transmitting the map data as it is and a method of generating a map having an image form in real time using map data of a server and displaying the map to a user by transmitting the map to a client are examples. Further, a tile map service (TMS) method has been developed as a method of storing map data in an image tile form in a server having a level of detail (LOD) structure and transmitting and showing only a tile map necessary according to a user's request to a client. The change of such map service methods has been focused on decreasing a user's standby time in consideration of limited client performance and network communication bandwidth.

Among the map service methods, in a TMS, map data of a server is configured as various kinds of layers such as A, B, . . . , and N shown in FIG. 1. Here, the various kinds of layers may be different types of layers such as a digital map, an aerial photograph map, an address map, and a geological map.

Further, map data of each layer is stored in an image tile form having an LOD structure such as LOD1, LOD2, . . . , and LODn shown in FIG. 1, a specific image tile map is transmitted, constructed, and visualized according to an LOD (or a zoom level) thereof and map coordinates requested by the user.

However, when the user wants to see plurality of layers instead of a single layer by combining data of the layers, it is necessary to merge tile maps of the layers. For this, in a current TMS, a method of providing a digital map layer, an aerial photograph layer, and a hybrid layer that is a result of previously merging the digital map layer and the aerial photograph layer has been used.

The current TMS method shows stable performance for a general purpose of providing a service based on a single layer, or a service based on a predetermined number of layers including a digital map, an aerial photograph map, and a hybrid map. However, in consideration of a recent trend in which types of data required to a map service have gradually been increased or more specialized applications have been used by experts rather than general users, a performance problem is occurring when dynamically merging and providing layers since the number of layers which are included in a map service has greatly increased. When a plurality of layers are added, and more particularly, when a layer to be added is not determined in advance, there is a problem in that merged layers have to be generated in advance.

SUMMARY OF THE INVENTION

The present invention is directed to a tile map service (TMS) device and method which provide a previously stored tile map in response to requests of various users or generates and provides a tile map in real time.

According to one aspect of the present invention, there is provided a TMS device, including: a storage configured to store map layers that have different map types, map data of an image tile form having a level of detail (LOD) structure of each of the map layers, and a tile map in which image tile maps of a plurality of map layers are merged; a communicator configured to receive map request information including two or more map types, an LOD level, and arbitrary map coordinates from a client; and a provider configured to provide a tile map corresponding to the map request information to the client.

The TMS device may further include a generator configured to generate a new tile map in which the image tile maps of the plurality of map layers are merged, and cache the generated new tile map in the storage.

The provider may check whether the tile map corresponding to the map request information is present in a cache of the storage, provide the tile map corresponding to the map request information stored in the storage to the client when a result of the checking is that the tile map corresponding to the map request information is present, and instruct the generator to generate a new tile map based on the map request information and provide the new tile map generated by the generator to the client when the result of the checking is that the tile map corresponding to the map request information is not present.

The generator may generate the new tile map by merging a first image tile map in which the arbitrary map coordinates are included among tile maps of an LOD level of a map layer of a first map type included in the map request information and a second image tile map in which the arbitrary map coordinates are included among tile maps of an LOD level of a map layer of a second map type included in the map request information.

The generator may dynamically merge the first image tile map and the second image tile map using an alpha blending method.

The different map types may include at least one among a digital map, an aerial photograph map, an address map, and a geological map.

According to another aspect of the present invention, there is provided a TMS method, including: receiving map request information including two or more map types, an LOD level, arbitrary map coordinates from a client; checking whether a tile map corresponding to the map request information is present in a cache of a memory; and providing the tile map corresponding to the map request information stored in the memory to a client when a result of the checking is that the tile map corresponding to the map request information is present, and providing a new tile map generated based on the map request information to the client when the result of the checking is that the tile map corresponding to the map request information is not present.

The providing of the new tile map may generate a new tile map in which image tile maps of a plurality of map layers included in the map request information are merged, and cache the generated new tile map in the memory.

Map layers of different map types, map data of an image tile form having a LOD structure of each of the map layers, and the generated tile map may be cached and stored in the memory.

The TMS method may further include: when the result of the checking is that the tile map corresponding to the map request information is not present, generating the new tile map by merging a first image tile map in which the arbitrary map coordinates are included among tile maps of an LOD level of a map layer of a first map type included in the map request information and a second image tile map in which the arbitrary map coordinates are included among tile maps of an LOD level of a map layer of a second map type included in the map request information.

The generating of the new tile map may dynamically merge the first image tile map and the second image tile map using an alpha blending method.

The different map types may include at least one among a digital map, an aerial photograph map, an address map, and a geological map.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 6 is a flowchart for describing a TMS method according to an embodiment of the present invention.

DETAILED DESCRIPTION OF EXEMPLARY EMBODIMENTS

Figure 1:
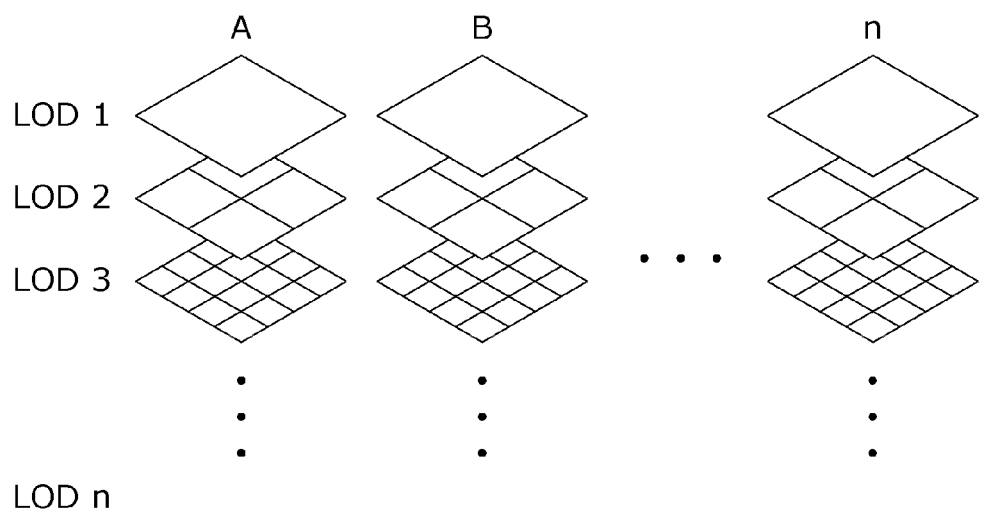
FIG. 1 is a diagram illustrating a structure of map data of a conventional tile map service.

The above and other objects, features, and advantages of the present invention will become more apparent to those of ordinary skill in the art by describing embodiments thereof in detail with reference to the accompanying drawings. However, the present invention is not limited to embodiments which will be described hereinafter, and can be implemented as various different types. Embodiments of the present invention are described below in sufficient detail to enable those of ordinary skill in the art to embody and practice the present invention. The present invention is defined by claims. Meanwhile, the terminology used herein to describe embodiments of the present invention is not intended to limit the scope of the present invention. In this specification, the articles "a," "an," and "the" are singular in that they have a single referent, but the use of the singular form in the present document does not preclude the presence of more than one referent. It should be further understood that the terms "comprises," "comprising," "includes," and/or "including" specify the presence of stated features, items, steps, operations, elements, and/or components when used herein, but do not preclude the presence or addition of one or more other features, items, steps, operations, elements, components, and/or groups thereof.

Hereinafter, embodiments of the present invention will be described in detail with reference to the accompanying drawings. In the drawings, when reference numerals are added to elements of each drawing, like reference numerals refer to like elements even when the like elements are illustrated in different drawings. When detailed descriptions of related known configurations and functions can obscure the gist of the present invention, the detailed descriptions will be omitted from the description of the present invention.

Figure 2:
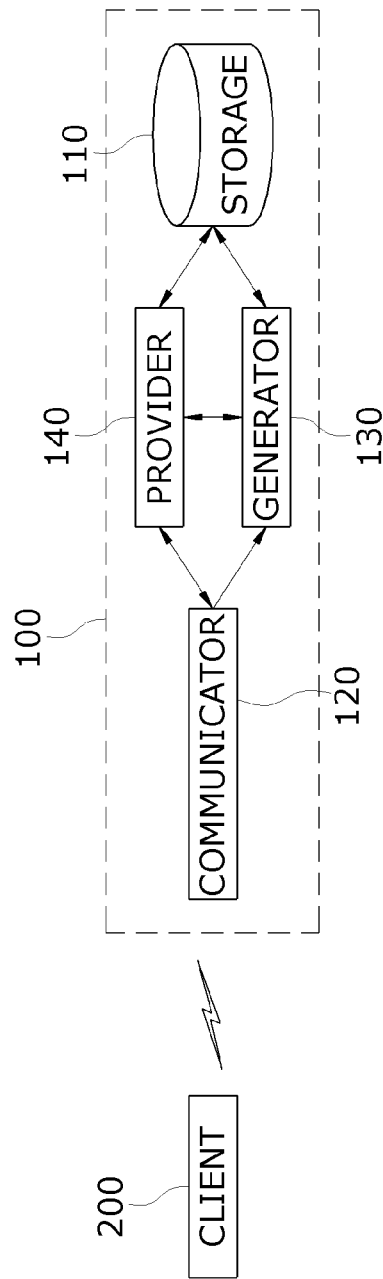
FIG. 2 is a block diagram illustrating a tile map service (TMS) device according to an embodiment of the present invention.

FIG. 2 is a block diagram illustrating a tile map service (TMS) device according to an embodiment of the present invention.

As shown in FIG. 2, a TMS device 100 according to an embodiment of the present invention may include a storage 110, a communicator 120, a generator 130, and a provider 140.

Figure 3:
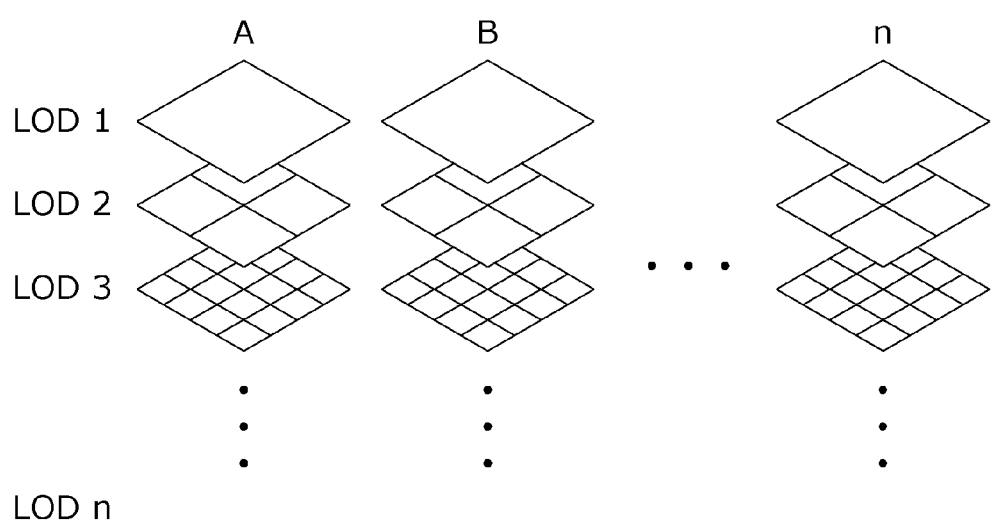
FIG. 3 is a diagram illustrating a structure of map data stored in a storage according to an embodiment of the present invention.

The storage 110 may store map data used for providing a TMS. In detail, the storage 110 may store map layers that have different map types (A, B, . . . , and N, here, N may be the number of map types stored in the storage 110) as shown in FIG. 3. Here, the map types may include various map types such as a digital map, an aerial photograph map, an address map, a geological map, etc. Further, various types of map layers in addition to the map types described above may be stored in the storage 110.

Further, map data of each of a plurality of map layers may be stored in an image tile form having a level of detail (LOD) structure as shown in FIG. 3. For example, a plurality of LOD levels (LOD1, LOD2, . . . , and LODn, here, n is a predetermined number of storage levels) may be stored in the storage 110 according to a predetermined accuracy (a storage level or a zoom level) for each of the plurality of map layers. In this case, the LOD level for each of the plurality of map layers may be stored by being divided into tile maps having the same area based on the same map coordinates when the LOD levels for the plurality of map layers have even different map types but are the same level.

The communicator 120 may receive an LOD level and arbitrary map coordinates with two or more map types requested by a user from a client 200. Hereinafter, for convenience of explanation, all of the two or more map types, the LOD level, and the arbitrary map coordinates requested by the user may be referred to as map request information.

In this case, the client 200 may be a device, such as a mobile terminal (for example, a smart phone) or a personal computer (PC) possessed by the user, capable of receiving the map types, the LOD level, and the map coordinates desired by the user through a manipulation of the user. In this case, the communicator 120 may communicate data with the client 200 using wireless communication such as wireless-fidelity (Wi-Fi), Bluetooth, etc. Further, the client 200 may provide a tile map image to the user by displaying a tile map image generated in and transmitted from the TMS device 100 in response to the transmitted map request information on a screen.

The generator 130 may merge the image tile maps of different map layers on the basis of the map request information (the map types, the LOD level, and the map coordinates) transmitted through the communicator 120, and generate a new tile map. For example, the generator 130 may dynamically merge image tile maps of different map layers using an alpha blending method, and generate a new tile map. In this case, the generator 130 may merge image tile maps of different map layers using various methods of merging the image tile maps in addition to the alpha blending method.

For example, the user may want to see all of map types A, B, and C in real time with respect to an arbitrary LOD level LODn and map coordinates (x, y). Hereinafter, for convenience of explanation, an example in which a tile map is generated by merging three map types is described, but the present invention is not limited thereto, and two or more map types may be merged.

Figure 4:
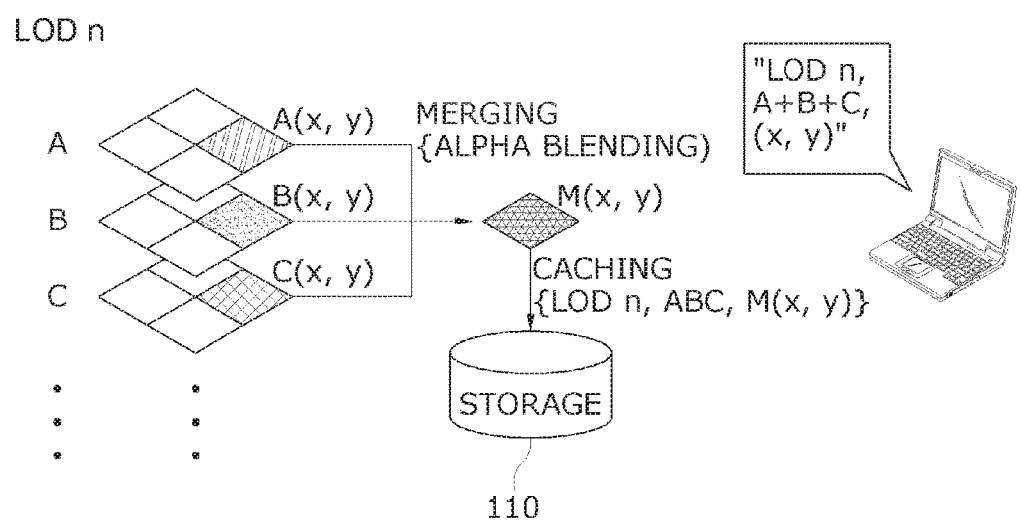
FIG. 4 is a reference diagram for describing an operation of generating and caching a tile map according to an embodiment of the present invention.

In this case, as shown in FIG. 4, the generator 130 may merge a tile map A(x, y) (a first image tile map) in which map coordinates (x, y) are included in the LOD level LODn of the map type A, a tile map B(x, y) (a second image tile map) in which the map coordinates (x, y) are included in the LOD level LODn of the map type B, and a tile map C(x, y) (a third image tile map) in which the map coordinates (x, y) are included in the LOD level LODn of the map type C, and generate a new tile map M(x, y).

Further, the generator 130 may cache the generated new tile map M(x, y) in the storage 110 or a separate memory. Hereinafter, for convenience of explanation, an example in which the new tile map M(x, y) is cached in the storage 110 will be described. For example, the generator 130 may cache the generated new tile map M(x, y) in the form of {LODn, ABC, M(x, y)} to correspond to the LOD level, the merged map type, and the map coordinates.

Figure 5A:
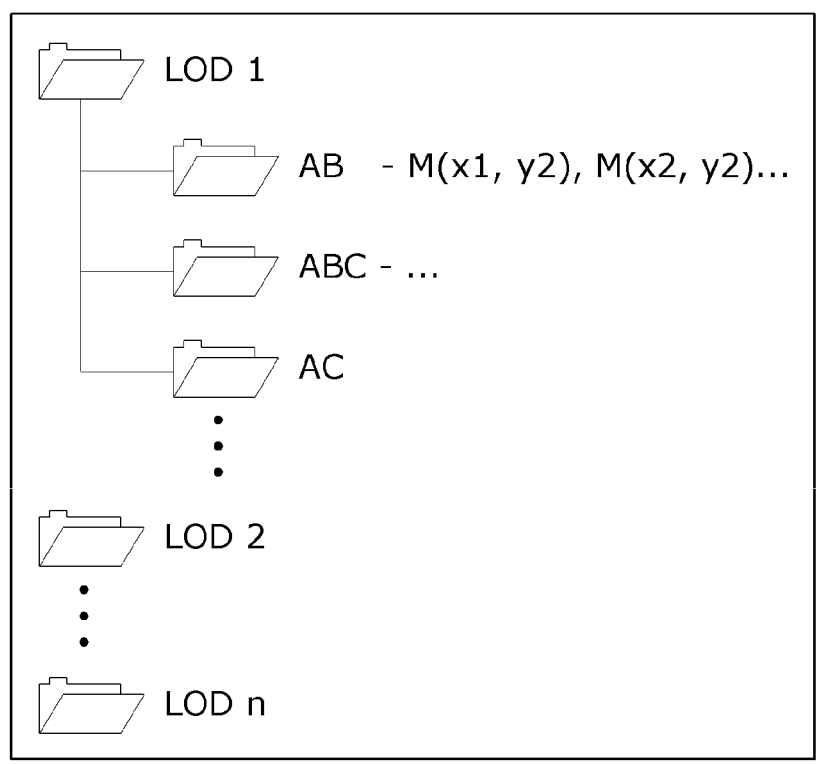
FIG. 5A and FIG. 5B are diagrams illustrating a cache structure of a tile map stored in a storage according to an embodiment of the present invention.
Figure 5B:
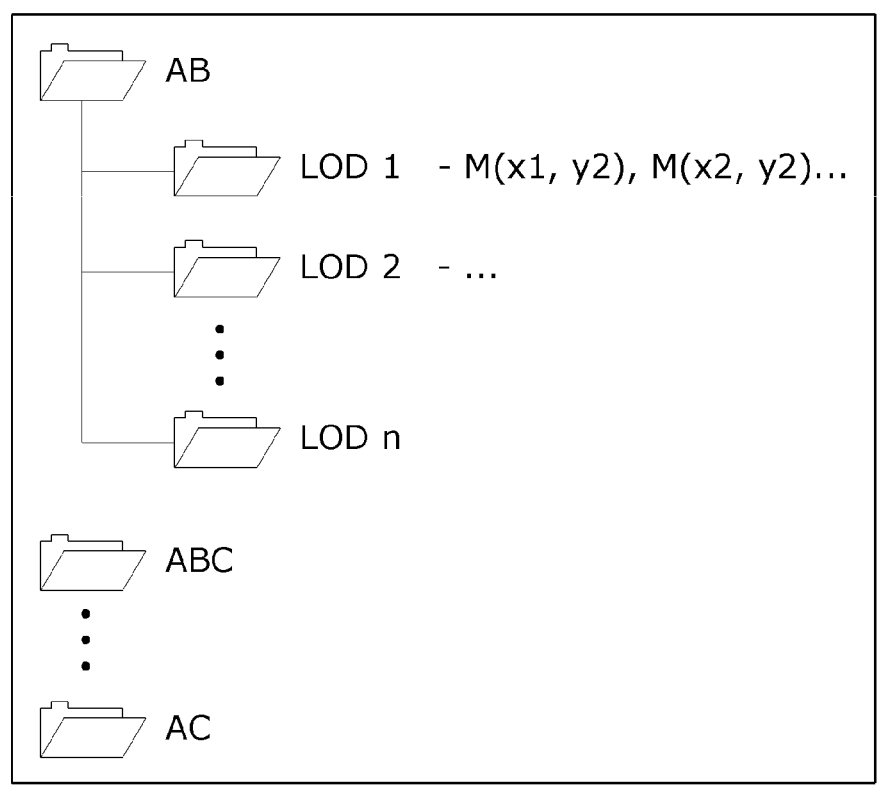

In this case, a cache structure may have a structure shown in FIG. 5.A illustrates a structure in which tile maps are cached by being distinguished using LOD levels such as LOD1, LOD2, . . . , and LODn, being distinguished using merged map layer types such as AB, ABC, AC, . . . , etc. in a sublayer thereof, and being distinguished using map coordinates such as M(x1, y2), M(x2, y2), . . . , etc. in the sublayer. As another example, FIG. 5B illustrates a structure in which tile maps are cached by being distinguished using merged map layer types such as AB, ABC, AC, . . . , etc., and then being distinguished using LOD levels such as LOD1, LOD2, . . . , and LODn in a sublayer thereof, and being distinguished using the map coordinates such as M(x1, y2), M(x2, y2), . . . , etc. in the sublayer. In addition, the generator 130 may perform a caching operation by distinguishing tile maps using the LOD levels, the merged map layer types, and the map coordinates in a similar manner as described above.

The provider 140 may transmit the new tile map generated by the generator 130 to the client 200 to provide a map image requested by the user. For example, the provider 140 may transmit the new tile map generated based on the map request information to the client 200 through the communicator 120.

Meanwhile, before the new tile map is generated in the generator 130, the provider 140 may perform an operation of checking whether the tile map requested by the user is present in a cache of the storage 110. In detail, the provider 140 may determine whether to generate the new tile map or to directly transmit a cached tile map to the client by searching a cache structure of the storage 110 based on the map request information transmitted through the communicator 120. In this case, the provider 140 may check whether a previously merged tile map is present in the cache of the storage 110 using the map types, the LOD level, and the map coordinates (LODn, A+B+C, and (x, y)) included in the map request information transmitted through the communicator 120.

When a merged tile map corresponding to the map request information is present based on the result of the checking of the provider 140, the provider 140 may directly transmit the corresponding tile map of the storage 110 to the client 200 through the communicator 120. When the merged tile map corresponding to the map request information is not present based on the result of the checking of the provider 140, the provider 140 may instruct the generator 130 to generate a new tile map based on the map request information. Subsequently, the provider 140 may transmit the new tile map generated by the generator 130 to the client 200 through the communicator 120. In this case, the generated new tile map may be cached in the storage 110.

As such, according to the embodiment of the present invention, a new tile map may be generated by dynamically merging map layers that have different map types, a cached tile map may be provided in response to a map data request of a user by previously caching and storing the generated tile map, or a new tile map may be generated and provided. Accordingly, since the TMS device can rapidly respond to various map data requests of a user, responsiveness to the user may be increased, a performance load may be decreased, and a failure may be prevented.

FIG. 6 is a flowchart for describing a TMS method according to an embodiment of the present invention.

Hereinafter, unless otherwise stated, the TMS method may be considered to be executed by the TMS device 100 according to an embodiment of the present invention.

The TMS device 100 may receive map request information requested by a user from the client 200 (S601). In this case, the map request information may include an LOD level and arbitrary map coordinates with two or more map types.

Here, the client 200 may be a device, such as a mobile terminal (for example, a smart phone) or a PC possessed by the user, capable of receiving the map types, the LOD level, and the map coordinates desired by the user through a manipulation of the user. In this case, the TMS device 100 may communicate data with the client 200 using wireless communication such as Wi-Fi, Bluetooth, etc. Further, the client 200 may provide a tile map image to the user by displaying a tile map image generated in and transmitted from the TMS device 100 in response to the transmitted map request information on a screen.

The TMS device 100 may check whether a previously stored tile map corresponding to the map request information received in Operation S601 is present (S602). In this case, the previously stored tile map may be information generated by previous map request information and cached in a memory.

In detail, the TMS device 100 may determine whether to generate a new tile map or to directly transmit the cached tile map to the client 200 by searching for a cache structure of the memory based on the map request information. In this case, the TMS device 100 may check whether a previously merged tile map is present in a cache of the memory using the map types, the LOD level, and the map coordinates (LODn, A+B+C, (x, y)) included in the map request information.

When the previously stored tile map is not present based on the result of the checking of Operation S602, the TMS device 100 may generate a new tile map based on the received map request information in operation S601 (S603). In this case, the TMS device 100 may generate the tile map using the map data stored in the memory in order to provide a TMS.

For example, map layers that have different map types (A, B, . . . , and N, here, N may be the number of map types stored in the memory) as shown in FIG. 3 may be stored in the memory. Here, the map types may include various map types such as a digital map, an aerial photograph map, an address map, a geological map, etc. Further, various types of map layers in addition to the map types described above may be stored.

Further, map data of each of a plurality of map layers may be stored in an image tile form having an LOD structure as shown in FIG. 3. For example, a plurality of LOD levels (LOD1, LOD2, . . . , and LODn, here, n is the predetermined number of storage levels) may be stored in the memory according to a predetermined accuracy (a storage level or a zoom level) for each of the plurality of map layers. In this case, the LOD level for each of the plurality of map layers may be stored by being divided into tile maps having the same area based on the same map coordinates when the LOD levels for the plurality of map layers have even different map types but are the same level.

The TMS device 100 may merge the image tile maps of different map layers based on the map request information (the map types, the LOD level, and the map coordinates), and generate a new tile map. In this case, the TMS device 100 may dynamically merge the image tile maps of different map layers using an alpha blending method, and generate the new tile map. In this case, the TMS device 100 may merge the image tile maps of different map layers using various methods of merging the image tile maps in addition to the alpha blending method.

Hereinafter, it will be assumed that the user wants to see all of the map types A, B, and C in real time with respect to an arbitrary LOD level LODn and the map coordinates (x, y). For convenience of explanation, an example in which a tile map is generated by merging three map types is described, but the present invention is not limited thereto, and two or more map types may be merged.

As shown in FIG. 4, the TMS device 100 may merge the tile map A(x, y) (the first image tile map) in which the map coordinates (x, y) are included in the LOD level LODn of the map type A, the tile map B(x, y) (the second image tile map) in which the map coordinates (x, y) are included in the LOD level LODn of the map type B, and the tile map C(x, y) (the third image tile map) in which the map coordinates (x, y) are included in the LOD level LODn of the map type C, and generate the new tile map M(x, y).

Further, the TMS device 100 may cache the generated new tile map M(x, y) in the memory (S604). For example, the TMS device 100 may cache the new tile map M(x, y) generated in Operation S603 in the form of {LODn, ABC, M(x, y) } to correspond to the LOD level, the merged map type, and the map coordinates.

In this case, the cache structure may have the structure shown in FIG. 5A. illustrates the structure in which the tile maps are cached by being distinguish using the LOD levels such as LOD1, LOD2, LODn, being distinguished using the merged map layer types such as AB, ABC, AC, . . . , etc. in the sublayer thereof, and being distinguished using the map coordinates such as M(x1, y2), M(x2, y2), . . . , etc. in the sublayer. As another example, FIG. 5B illustrates the structure in which the tile maps are cached by being distinguished using the merged map layer types such as AB, ABC, AC, . . . , etc., being distinguished using the LOD levels such as LOD1, LOD2, . . . , and LODn in the sublayer thereof, and being distinguished using the map coordinates such as M(x1, y2), M(x2, y2), . . . , etc. in the sublayer. In addition, the TMS device 100 may perform the caching operation by distinguishing the tile maps using the LOD levels, the merged map layer types, and the map coordinates in a similar manner as described above.

The TMS device 100 may transmit the tile map to the client 200 to provide the map image requested by the user S605. For example, the TMS device 100 may transmit the new tile map generated in Operation S603 to the client 200.

Meanwhile, when the previously stored tile map is present based on the checking result of Operation S602, the TMS device 100 may directly transmit the corresponding tile map of the memory to the client 200 S606.

As such, according to the embodiment of the present invention, a new tile map may be generated by dynamically merging map layers that have different map types, a cached tile map may be provided in response to a map data request of a user by previously caching and storing the generated tile map, or a new tile map may be generated and provided. Accordingly, since the TMS method can rapidly respond to various map data requests of a user, responsiveness to the user may be increased, a performance load may be decreased, and a failure may be prevented.

While the present invention has been described in detail using the above-described embodiments of the present invention, it should be apparent to those skilled in the art that various modifications can be made to the above-described embodiments of the present invention without departing from the spirit or scope of the invention. It should therefore be understood that the above-described embodiments are illustrative in all aspects and not restrictive. The scope of the present invention is defined by the appended claims rather than the foregoing description, and the appended claims and all changes or modifications derived therefrom should be construed as being included within the scope of the present invention.

Figure 7:
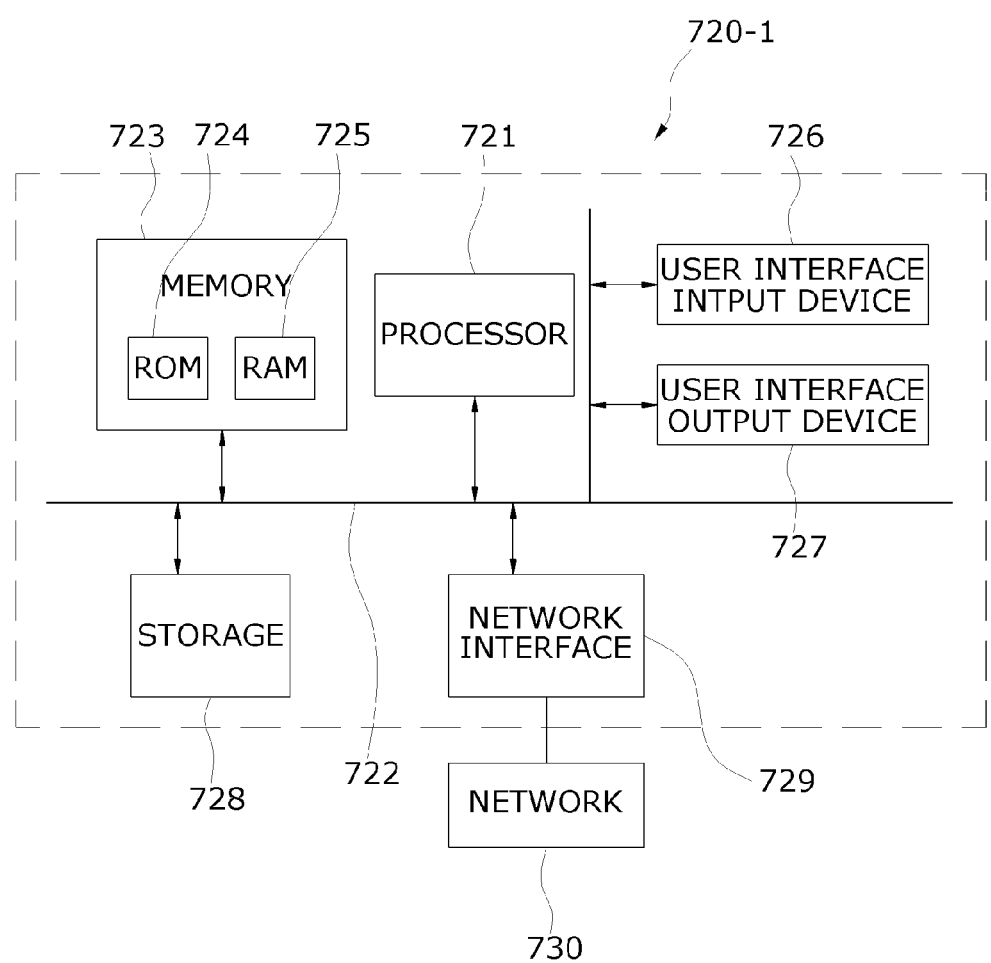
FIG. 7 is a view illustrating an example of a computer system in which a TMS method according to an embodiment of the present invention is performed.

The TMS method according to an embodiment of the present invention may be implemented in a computer system or may be recorded in a recording medium. FIG. 7 illustrates a simple embodiment of a computer system. As illustrated, the computer system may include one or more processors 721, a memory 723, a user input device 726, a data communication bus 722, a user output device 727, a storage 728, and the like. These components perform data communication through the data communication bus 722.

Also, the computer system may further include a network interface 729 coupled to a network. The processor 721 may be a central processing unit (CPU) or a semiconductor device that processes a command stored in the memory 723 and/or the storage 728.

The memory 723 and the storage 728 may include various types of volatile or non-volatile storage mediums. For example, the memory 723 may include a ROM 724 and a RAM 725.

Thus, the TMS method according to an embodiment of the present invention may be implemented as a method that can be executable in the computer system. When the TMS method according to an embodiment of the present invention is performed in the computer system, computer-readable commands may perform the producing method according to the present invention.

The TMS method according to the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A tile map service (TMS) device, comprising:
a data storage that stores map layers that have different map types, map data of an image tile form having a level of detail (LOD) structure of each of the map layers, and a tile map in which image tile maps of a plurality of map layers are merged; and
a processor that:
receives map request information including two or more map types, an LOD level, and arbitrary map coordinates from a client,
checks whether a previously merged tile map is present in the cache of the data storage using the map types, the LOD level, and the map coordinates included in the map request information by searching a cache structure of the storage,
generates a new tile map based on the map request information in which the image tile maps of the plurality of map layers are merged when the result of the checking is that the tile map corresponding to the map request information is not present,
caches the generated new tile map in the data storage corresponding to the LOD level, the merged map type, and the map coordinates, and
provides a tile map corresponding to the map request information to the client,
wherein each of the map layers have the same map tile coordinates.

2. The TMS device of claim 1, wherein the processor generates the new tile map by merging a first image tile map in which the arbitrary map coordinates are included among tile maps of an LOD level of a map layer of a first map type included in the map request information and a second image tile map in which the arbitrary map coordinates are included among tile maps of an LOD level of a map layer of a second map type included in the map request information.

3. The TMS device of claim 2, wherein the processor dynamically merges the first image the map and the second image the map using an alpha blending method.

4. The TMS device of claim 2, wherein the different map types include at least one among a digital map, an aerial photograph map, an address map, and a geological map.

5. A tile map service (TMS) method, comprising:
receiving map request information including two or more map types, an LOD level, and arbitrary map coordinates from a client;
checking whether a tile map corresponding to the map request information is present in a cache of a memory by searching a cache structure of the memory;
providing the tile map corresponding to the map request information stored in the memory to a client when a result of the checking is that the tile map corresponding to the map request information is present;
generating a new tile map based on the map request information when the result of the checking is that the tile map corresponding to the map request information is not present;
caching the generated new tile map in the storage corresponding to the LOD level, the merged map type, and the map coordinates; and
providing the new tile map corresponding to the map request information to a client,
wherein image tile maps of a plurality of map layers have the same map tile coordinates.

6. The TMS method of claim 5, further comprising: when the result of the checking is that the tile map corresponding to the map request information is not present, generating the new tile map by merging a first image tile map in which the arbitrary map coordinates are included among tile maps of an LOD level of a map layer of a first map type included in the map request information and a second image tile map in which the arbitrary map coordinates are included among tile maps of an LOD level of a map layer of a second map type included in the map request information.

7. The TMS method of claim 6, wherein the generating of the new tile map dynamically merges the first image tile map and the second image tile map using an alpha blending method.

8. The TMS method of claim 7, wherein the different map types include at least one among a digital map, an aerial photograph map, an address map, and a geological map.

* * * * *